UNITED STATES PATENT OFFICE.

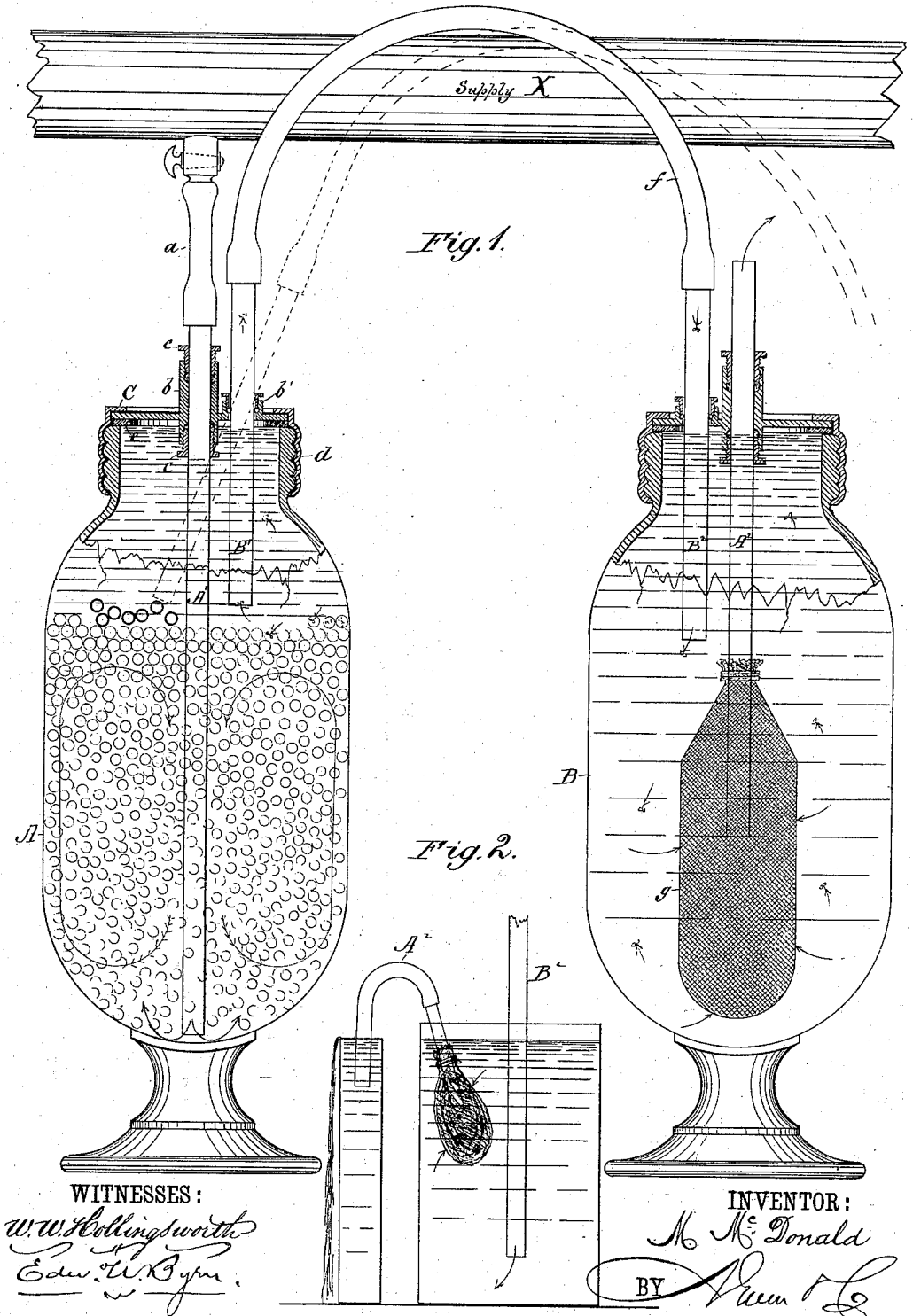

MARSHALL McDONALD, OF WASHINGTON, DISTRICT OF COLUMBIA, ASSIGNOR TO HIMSELF AND STEPHEN C. BROWN, OF SAME PLACE.

METHOD OF AND APPARATUS FOR HATCHING FISH.

SPECIFICATION forming part of Letters Patent No. 263,933, dated September 5, 1882.

Application filed June 12, 1882. (No model.)

*To all whom it may concern:*

Be it known that I, MARSHALL MCDONALD, of Washington city, District of Columbia, have invented a new and Improved Method of and Apparatus for Hatching Fish; and I do hereby declare that the following is a full, clear, and exact description of the same, reference being had to the accompanying drawings, forming part of this specification, in which—

Figure 1 is a side elevation, partly in section, of my improved hatching-jar and collector as connected for use. Fig. 2 is a side elevation of a modification of the collector.

The object of my invention is to provide a method of and apparatus for hatching fish, automatically agitating the eggs, eliminating the small fry as soon as hatched, and separating the bad eggs and old shells, and thereby avoiding the contamination of the sound ones.

To these ends my invention consists in the improved method of separating the bad eggs, and also the small fry when hatched, from the eggs remaining in the jar, which consists in agitating the eggs by a forced circulation of water in a closed chamber which is entirely filled with water, and taking off the discharge-water from said jar, and with it the bad eggs, (or small fry, as the case may be,) at a point central with respect to the body of the chamber, in contradistinction to taking off the bad eggs at the surface by overflow from an open jar.

In the drawings, X represents a supply-pipe containing water under pressure and of a temperature between 50° and 80°.

A is the hatching-jar, and B the receiver or collector, which together constitute a complete automatic apparatus, but of which there may be a multiple series, according to the requirements of production. Both the hatching-jar and the collector have two glass tubes, A′ B′ and A² B². Of these tubes, A′ of the hatching-jar connects by a rubber tube, *a*, with the water-supply, and extends to nearly the bottom of the jar, being held firmly in a tubular sleeve, *b*, of the cover C of the jar, so as to maintain the central position of the tube in said jar. This tube A′ may, however, be adjusted vertically in its sleeve to bring its lower end closer to or farther from the bottom of the jar. The reason for this is as follows: The central position of the tube causes the inflow of water to spread symmetrically over the bottom of the jar and cause uniform agitation and circulation of the eggs, as shown by the long arrows. By adjusting the tube down close to the bottom of the jar the stream of water is somewhat retarded or diverted in flow, but increased in vigor of circulation, causing it to be spread out in a thin active sheet, which produces an active circulation and agitation of the eggs in the direction shown by the long arrows. By raising the tube the flow is increased; but the water, instead of being spread by immediate contact with the bottom of the jar, is diffused through the capacity of the jar, making a less active circulation and agitation of eggs. By these very simple and practical adjustments, it will be seen, I am enabled to definitely regulate and control the agitation of eggs and flow of water according to the necessities of the case. This tube A′ is rendered water-tight in the sleeve *b* by small stuffing-boxes *c c* at the top and bottom, which by frictional contact hold the tube A to its adjustments against the pressure of the water. The other tube, B′, of the hatching-jar is the outlet-tube for the water, the small fry, and the bad eggs when it is required to remove the latter. This tube is arranged in a short sleeve, *b′*, in the cover of the jar, which is also provided with a stuffing-box to render it tight, but which permits this tube to be deflected, as shown in dotted lines, for the purpose hereinafter described. In constructing the sleeve *b′* so as to permit this deflection of the tube said sleeve and also the removable thimble of the stuffing-box are made of a larger diameter than the tube B′, and the packing in the stuffing-box is in the nature of a round rubber ring confined between the said thimble and sleeve, and large enough to act as a fulcrum for the tube B′ when it is to be deflected.

The cover to the jar A is held down upon the jar by means of a screw-ring, *d*, upon a gum gasket, *e*, so as to form a perfectly tight closed jar. The receiving-jar B is provided with a similar tight cover, and has similar tube-connections for its tubes A² B², one of which tubes, B², is connected to the tube B′ of jar A by a rubber pipe, $f$, and the other of which, $A^2$, is the discharge-pipe, and opens into any suitable receiver for the waste water. Over the lower end of the discharge-tube $A^2$ is a large filtering-bag, $g$, distended over a cage, the object of which is to secure a discharge from this closed jar commensurate with the inflow without creating a violent suction through the filter, which would injure the young and delicate fish.

The jars are preferably of glass, so as to permit the operation to be inspected without opening the jar or affecting the flow of water. They are also preferably of a cylindrical shape, with rounded or oval internal ends. In practice they are filled about three-fourths full of eggs that have been impregnated or vitalized with the milt of the male, and the tubes are then adjusted to about the position shown. The constant flow of water under pressure into and out of the closed jar now gives the required movement to the eggs, and when the fish is freed from its shell it very soon is caught in the current of water passing up tube $B'$, and is thereby transferred to the collector or receiver B, where it remains, while the water passes out through the strainer $g$. As the eggs are agitated by the current in A the bad eggs and the shells, by reason of their less specific gravity, accumulate from time to time on the top of the strata of sound eggs, which bad eggs, by reason of their opacity, I have represented by a few heavy circles at the top. Now, to get rid of them the tube $f$ is disconnected from $B^2$ and tube $B'$ is deflected till its end is in their vicinity, as shown in dotted lines, when the induction of water draws off these eggs, which are thrown away. After the jar has been purged of these eggs, pipe $f$ is again connected to $B^2$ and the fish are allowed to pass over automatically again.

The fish-culturist in practice has to deal with two classes of eggs: first, those which have a greater specific gravity than the medium in which they are deposited, and which therefore descend to and remain at the bottom, unless kept in suspension by the action of the water. The second class of eggs are specifically lighter than the water in which they are deposited, and tend to the surface, and remain there unless disturbed by the agitation of the water by winds or waves, when they are diffused through and held in suspension in the surface stratum. These eggs all belong to salt-water species of fish—such as the cod or mackerel—are very delicate in structure, drift with the current, and up to the present time no methods or apparatus of hatching have been devised that could handle them on a large scale. Indeed, it is only in the last three years that the attention of the Fish Commission has been directed to the expediency and necessity of resorting to artificial methods of reproduction in order to maintain the supply of these fish.

Fish-culturists have heretofore been chiefly interested in the artificial propagation of species that spawn in fresh water, all of which have heavy eggs, and the methods and apparatus have been devised solely with reference to this class of eggs. My automatic fish-hatching jar proposes to handle both classes of eggs, and with a precision and perfection of results not attainable by any existing apparatus. In the case of heavy eggs—such as the shad and the white fish—for which the jar, as illustrated in the drawings, is arranged, the central tube serves as a supply-tube, introducing a current of water to the bottom of the vessel under pressure. This buoys up and filters through the mass of eggs that fills three-fourths of the entire interior capacity of the jar, communicating to the whole a slow boiling motion, and enveloping each egg in a film of fresh water constantly renewed. The dead eggs, being a little lighter than the live ones, by degrees work to the surface and under the outlet-tube, which, by being set at a proper distance, determined by experience, will in the course of twenty-four hours remove every dead egg, leaving only a compact mass of clean live eggs when the period of hatching approaches. The importance of this is appreciated when we consider that a single dead egg will develop fungus which may involve in its meshes and destroy many other healthy live eggs during the period of incubation. When the hatching begins connection is established with the collector, to which the young fish as they break the shell and swim up in the water, are transferred by the current of water, and in which they are collected and retained without injury until ready for shipping.

The advantages of the apparatus are as follows:

First, the almost complete automatic performance, reducing attendance, and therefore the cost of production, to a minimum.

Second, the complete separation of the dead eggs from the living and the perfect circulation of water secure the hatching of every healthy impregnated egg, and necessarily yields a much larger percentage of production than any apparatus now in use.

Third, the collector enables us to collect in convenient condition for shipping and retain without injury all the fish that are hatched.

Fourth, the getting rid of the dead decomposing eggs and largely of the shells leaves the young fry clean and in the best condition for shipping—a cleanliness and therefore safety in transportation not possible to secure with existing apparatus without a degree of assiduous and careful attention which adds vastly to the work of the hatching-room.

Fifth, the use of close vessels for hatchers and collectors worked full of water under a head enables me to use the apparatus aboard cars or on vessels—a result not attainable with existing apparatus, and which vastly increases the possibilities of fish-culture.

In hatching buoyant eggs the direction of current is reversed, the water entering at the top and passing out at the bottom—in other words, the direction of the current is reversed, while in other respects the manipulation is the same.

As shown in the drawings, each hatching-jar is connected with a separate collecting-jar, which is also closed. I may, however, as a modification of my invention, have a common collector for a number of hatching-jars and for laboratory use where the jars are stationary or not in transit. This common collector may be an open jar or aquarium, as shown in Fig. 2, in which $B^2$ is one of the tubes from the hatching-jars, and $A^2$ a siphon discharge-pipe with filter for carrying off the waste water, which siphon has its outer end closed by a body of water in another vessel.

I am aware of the patents to Chase, August 16, 1881, and Wilmot, July 18, 1876, and I do not claim anything shown therein.

My invention is distinctive with respect to processes described in the foregoing, and especially the Wilmot process, in that he uses an open vessel and separates the bad eggs, which are of less specific gravity, by overflow from an open vessel. I take advantage of the same principle of separating the bad from the good eggs through their different specific gravities. My process is, however, distinct in the following respects: The forced circulation in a closed vessel, and discharging the water from the vessel at a point more or less central to said chamber or below the surface of the water enable me to secure the following important results: First, I am enabled to effect the separation at any point in the jar without change in the water-circulation, and thus can treat a very small quantity of eggs in the jar as well as if the jar were filled nearly to the top, as is necessary in Wilmot's invention; secondly, I avoid all slopping over of the water in the jar and avoid waste of eggs, thus permitting my process to be conducted on cars during transportation; thirdly, by taking off the discharging water in the forced circulation at a point more or less central to the jar, I avoid the spattering of the water and damage to the small fry involved in the fall from an overflowing vessel; and, fourthly, this mode of carrying off the water draws the eggs and small fry into its current with a gentle but positive suction whose influence is distributed throughout the jar, while a surface overflow has no effect in eliminating the bad eggs until they get upon the immediate surface.

Having thus described my invention, what I claim as new is—

1. The improved process of automatically separating the bad eggs and small fry from fish-eggs during incubation, which consists in agitating them in a closed chamber filled full of water by means of a forced circulation of the same, and drawing off the discharge-water along with the bad eggs or small fry at a point below the surface of the water, or more or less central with respect to the jar, as described.

2. A fish-hatching jar composed of closed glass vessel A, a detachable cover, and the inlet and outlet tubes $A'$ $B'$, one being adjustable in vertical direction and the other being deflectible, as shown and described.

3. A collector for the small fry, consisting of a jar or vessel having an inlet-tube and an outlet-tube, with an enlarged or cage filter on its inner end immersed in said jar or vessel, as and for the purpose described.

4. The combination of the closed hatching-jar A, having tubes $A'$ $B'$ for a forced circulation, and the collector B, having connecting-tubes $B^2$ and $f$, and a discharge-tube, $A^2$, with a cage-filter, as shown and described.

The above specification of my invention signed by me in the presence of two subscribing witnesses.

MARSHALL McDONALD.

Witnesses:
EDW. W. BYRN,
CHAS. A. PETTIT.